US012665350B2

(12) United States Patent
Johnson et al.

(10) Patent No.: US 12,665,350 B2
(45) **Date of Patent: *Jun. 23, 2026**

(54) ELECTROMAGNETIC ELECTRICAL CONNECTOR SYSTEM

(71) Applicant: Onanon, Inc., Milpitas, CA (US)

(72) Inventors: Dennis J. Johnson, Milpitas, CA (US); Keyon Keshtgar, Milpitas, CA (US)

(73) Assignee: Onanon, Inc., Milpitas, CA (US)

( * ) Notice: Subject to any disclaimer, the term of this patent is extended or adjusted under 35 U.S.C. 154(b) by 391 days.

This patent is subject to a terminal disclaimer.

(21) Appl. No.: 18/461,194

(22) Filed: Sep. 5, 2023

(65) Prior Publication Data

US 2023/0411903 A1 Dec. 21, 2023

Related U.S. Application Data

(63) Continuation of application No. 17/524,367, filed on Nov. 11, 2021, now Pat. No. 11,757,229.

(51) Int. Cl.

| | |
|---|---|
| ***H01R 13/62*** | (2006.01) |
| ***H01R 13/645*** | (2006.01) |
| ***H01R 24/86*** | (2011.01) |
| *H01R 107/00* | (2006.01) |

(52) U.S. Cl.

CPC ..... *H01R 13/6205* (2013.01); *H01R 13/6456* (2013.01); *H01R 24/86* (2013.01); *H01R 2107/00* (2013.01)

(58) Field of Classification Search

CPC ...................... H01R 13/6205; H01R 13/6456; H01R 24/86; H01R 2107/00

See application file for complete search history.

(56) References Cited

U.S. PATENT DOCUMENTS

| | | | | |
|---|---|---|---|---|
| 3,808,577 | A | 4/1974 | Mathauser | |
| 4,874,316 | A | 10/1989 | Kamon | |
| 5,198,955 | A | 3/1993 | Willner | |
| 5,401,175 | A | 3/1995 | Guimond | |
| 5,909,100 | A * | 6/1999 | Watanabe | B60L 53/126 320/108 |
| 5,943,199 | A | 8/1999 | Aromin | |
| 6,298,255 | B1 | 10/2001 | Cordero | |
| 6,340,926 | B1 | 1/2002 | Chu | |
| 6,623,276 | B2 | 9/2003 | Ferrerfabrega | |
| 7,311,526 | B2 | 12/2007 | Rohrbach | |
| 7,722,358 | B2 | 5/2010 | Chatterjee | |
| 7,869,168 | B2 | 1/2011 | Sullivan | |
| 8,348,678 | B2 | 1/2013 | Hardisty | |

(Continued)

*Primary Examiner* — Thanh Tam T Le

(74) *Attorney, Agent, or Firm* — Neustel Law Offices

(57) ABSTRACT

An electrical connector system for assisting in coupling and unmating electrical connectors. The system generally includes an electromagnet to assist in mating and, alternatively, unmating or uncoupling a first electrical connector with a second electrical connector. The system may include a first electrical connector having a first plurality of contacts, an electromagnet on the first electrical connector adapted to produce a magnetic force, and an input device adapted to receive an input and to provide an output that causes an electrical current to be supplied to the electromagnet. When coupled, the first plurality of electrical contacts are conductively engaged with a second plurality of electrical contacts on the second electrical connector.

19 Claims, 11 Drawing Sheets

(56) References Cited

U.S. PATENT DOCUMENTS

| | | | | |
|---|---|---|---|---|
| 8,596,881 | B2 | 12/2013 | Umeno | |
| 9,088,098 | B2 * | 7/2015 | Hwang | H01R 13/633 |
| 9,543,694 | B2 * | 1/2017 | Tagawa | A61B 6/4405 |
| 9,640,921 | B2 * | 5/2017 | Choi | H01R 13/6683 |
| 9,755,355 | B2 * | 9/2017 | Schwalbach | H04B 1/3833 |
| 9,985,384 | B1 | 5/2018 | Johnson | |
| 10,096,938 | B2 * | 10/2018 | McClelland | H01R 13/629 |
| 10,297,950 | B2 * | 5/2019 | Wei | A41D 13/0051 |
| 10,446,990 | B2 * | 10/2019 | Dykas | H01R 13/7038 |
| 10,454,208 | B2 * | 10/2019 | Johnson | H01R 13/6456 |
| 10,522,943 | B1 * | 12/2019 | Termini | H01R 24/86 |
| 10,658,793 | B2 * | 5/2020 | Blake | G06F 1/18 |
| 10,770,828 | B2 * | 9/2020 | Cao | H01R 13/701 |
| 10,817,453 | B2 * | 10/2020 | Abdul-Razzak | G06F 1/1632 |
| 11,374,367 | B2 * | 6/2022 | Johnson | H01R 13/641 |
| 11,381,033 | B2 * | 7/2022 | Johnson | H01R 13/506 |
| 2007/0141860 | A1 | 6/2007 | Hernandez | |
| 2010/0035441 | A1 | 2/2010 | Rohrbach | |
| 2014/0092535 | A1 | 4/2014 | Chou | |
| 2022/0324341 | A1 | 10/2022 | Yu | |

* cited by examiner

ELECTROMAGNETIC ELECTRICAL CONNECTOR SYSTEM

CROSS REFERENCE TO RELATED APPLICATIONS

The present application is a continuation of U.S. application Ser. No. 17/524,367, filed on Nov. 11, 2021, which will issue as U.S. Pat. No. 11,757,229 on Sep. 12, 2023.

STATEMENT REGARDING FEDERALLY SPONSORED RESEARCH OR DEVELOPMENT

Not applicable to this application.

BACKGROUND

The described example embodiments in general relate to a magnetic connector for making electrical connections. More particularly, example embodiments relate to a magnetic connector that selectively uses magnetic attraction to a second electrical connector to reduce the force or effort needed by a user to mate or unmate connectors.

Electrical connectors for connecting power, data and/or other electrical signals between a source and devices or equipment are well known and ubiquitous. More particularly, connectors that simultaneously provide multiple electrical connections using coupled male and female components are well known. For example, some connectors employ a plurality of electrical contacts, such as electrically conductive pins or sockets, and a corresponding plurality of mating contacts, such as electrically conductive sockets or receptacles in a second electrical connector. Typically, although not necessarily, an insulated cable or cord carries a plurality of power and/or signal wires, each of which may also be insulated, from a source to the non-connecting or back side of either a male or female connector, where the individual wires are electrically connected to pins or sockets. Similarly, a corresponding plurality of power and/or signal wires are electrically connected to corresponding pins or sockets on the back or non-connecting side of the mating male or female connector, and an insulated cable or cord carries the plurality of power and/or signal wires to the device or equipment to be electrically connected with the source. Multiple electrical connections between a source and a device or piece of equipment can then be made substantially simultaneously by coupling the male and female connectors such that the pins or sockets of the connector make electrical contact with the corresponding sockets or pins of the second electrical connector.

In some types of known connectors, the mechanical connection between mating pins and sockets requires force to make the connection between mating connectors. This type of connection can have disadvantages, such as varying amounts of force being needed to mate the connectors, depending on the number of pins and sockets, their sizes, and their overall design, which can affect the force needed to mate and unmate each pin from each socket.

In addition, reliance on a friction or mechanical fit between pins and sockets may become less reliable over time, resulting in intermittent electrical connections, particularly in cases where the connectors are subject to vibration, temperature changes, or relative movement between the connectors.

SUMMARY

Some of the various embodiments of the present disclosure relate to an electrical connector system that uses an electromagnet to assist in mating and, alternatively, unmating or uncoupling a first electrical connector with a second electrical connector. In some embodiments, the system may include a first electrical connector having a first plurality of contacts, an electromagnet on the first electrical connector adapted to produce a magnetic force, and an input device adapted to receive an input and to provide an output that causes an electrical current to be supplied to the electromagnet.

The system may further include a second electrical connector having a second plurality of contacts and a magnetic element on the second electrical connector, wherein the magnetic force of the first connector acts on the magnetic element such that the magnetic force attracts the first electrical connector to the second electrical connector, wherein the first electrical connector and the second electrical connector are adapted to be coupled together, and wherein the first plurality of contacts conductively engage with the second plurality of contacts when the first electrical connector and the second electrical connector are coupled together.

In some other embodiments, the first electrical connector may further include a proximity detector adapted to detect a proximity of the second electrical connector and to provide an input to a control circuit that causes the control circuit to disable the electrical current until the first electrical connector is in a position relative to the second electrical connector such that the electromagnet applies the magnetic force to the magnetic element in the second electrical connector.

There has thus been outlined, rather broadly, some of the embodiments of the present disclosure in order that the detailed description thereof may be better understood, and in order that the present contribution to the art may be better appreciated. There are additional embodiments of that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different figures use identical reference numbers, the elements are generally either identical or at least similar in function or purpose.

DETAILED DESCRIPTION

A. Overview

Figure 1:
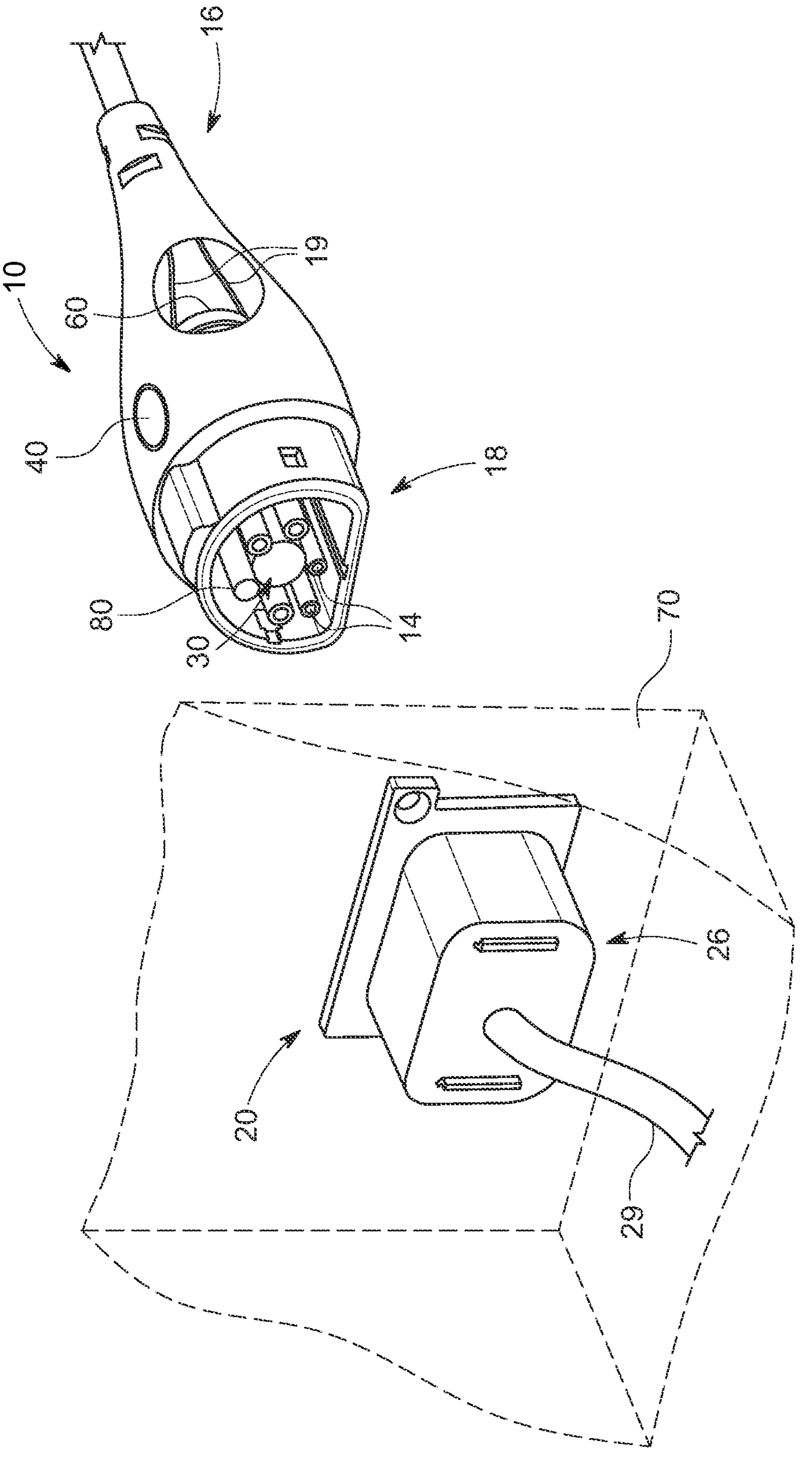
FIG. 1 is a perspective view of an electrical connector system in accordance with an example embodiment.
Figure 2:
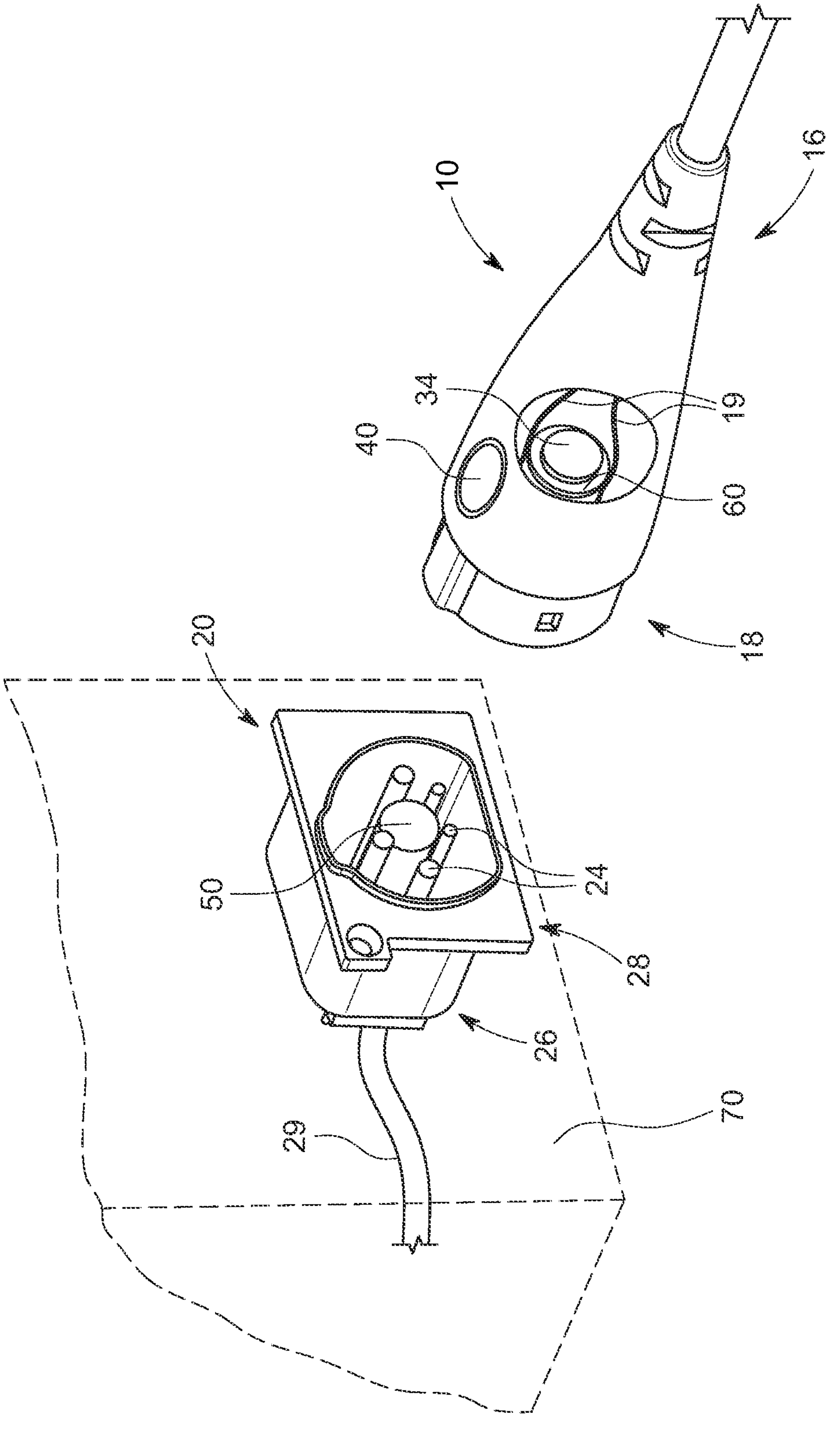
FIG. 2 is another perspective view of an electrical connector system in accordance with an example embodiment.

Some of the various embodiments of the present disclosure relate to an electrical connector system that can use an electromagnet 30 to assist in mating and unmating a first electrical connector 10 with a second electrical connector 20. The electromagnet 30 is on the first electrical connector 10, and is adapted to produce a magnetic force that acts on a magnetic element 50 of the second electrical connector 20. The first electrical connector 10 may have an input device 40 that controls, directly or indirectly, current to the electromagnet 30, so that the electromagnet 30 can be selectively activated or deactivated. This allows for greater magnetic force to be used without causing any difficulty in unmating the connectors. The first electrical connector 10 and the second electrical connector 20 are adapted to be coupled together.

The input device 40 may be adapted to receive an input and to provide an output that causes the electrical current to be supplied to the electromagnet 30. The output may be current that is provided directly to the electromagnet 30, or it may be provided to a control circuit 60 that in turn provides current to the electromagnet 30. The control circuit 60 is responsive to the input from the input device 40 to selectively apply and control the electrical current to the electromagnet 30. In other words, the control circuit 60 may turn the current to the electromagnet on or off, apply the current in different directions (thus reversing the polarity of the electromagnet), and control its magnitude. In some embodiments, the control circuit 60 is adapted to adjust the electrical current such that the magnetic force generated by the electromagnet 30 can be adjusted.

The control circuit 60 may be, or include, a relatively simple latching circuit, such that when it receives a single, momentary input, such as a logic "high" voltage, it creates a sustained output current that is provided to the electromagnet 30. Other inputs can also be used by the control circuit 60. For example, a proximity detector 80 may also provide an input to the control circuit 60, and can be used to disable the output current until the first electrical connector 10 is close to the second electrical connector 20, such that the electromagnet 30 is not attracted to any metal other than a magnetic element 50 in the second electrical connector 20.

The control circuit 60 is adapted to provide the electrical current to the electromagnet 30 in a first direction to create an attractive magnetic force between the electromagnet 30 and the magnetic element 50. The control circuit 60 can also reverse the current so that it flows in a second direction, thus creating a repulsive magnetic force between the electromagnet 30 and the magnetic element 50, which can be used to automatically unmate or unplug the connectors 10, 20.

In some embodiments, the input device 40 may comprise a switch, such as a push button switch. However, it may comprise other devices, such as a "touch switch" that senses a person's touch, using various circuitry, or a receiver that receives a wired or wireless signal. Accordingly, the input device 40 may not require mechanical movement or actuation to provide an output.

Some of the various embodiments of the present disclosure include a first electrical connector 10 and a second electrical connector 20, wherein the two connectors 10, 20 are adapted to be mechanically and electrically coupled together. The connectors 10, 20 may include multiple pins, sockets, or a combination of pins and sockets adapted to be conductively coupled together. Alternatively, the contacts may take other forms, such that electrical contact is made without a pin being inserted into a socket.

As an example of the electrical contacts, the first electrical connector 10 may have a first plurality of contacts 14 that are adapted to conductively engage with a corresponding, second plurality of contacts 24 on the second electrical connector 20 when the first electrical connector 10 and the second electrical connector 20 are coupled together. As noted, the contacts 14, 24 need not be pins or sockets. For example, multiple conductive portions of the first electrical connector 10 may simply make contact with corresponding conductive portions of the second electrical connector 20, such that multiple electrical connections can be made when the connectors 10, 20 are mated, and broken when the connectors 10, 20 are unmated. Such conductors may make surface contact with each other.

The first electrical connector 10 may have a male coupling component 18, which is adapted to mate with a female coupling component 28 of the second electrical connector 20. The male coupling component 18 may extend outwardly from the first electrical connector 10. Alternatively, the first electrical connector 10 may have a female coupling component 28 that mates with a male coupling component 18 of the second electrical connector 20. The first electrical connector 10 may include an electromagnet 30 that is recessed or positioned within the male coupling component 18. The first electrical connector 10 may also have a plurality of electrical contacts 14, such as pins or sockets, within the male coupling component 18.

The second electrical connector 20 may include a female coupling component 28 having, or surrounding, a plurality of electrical contacts 24 adapted to be conductively coupled with the contacts 14 of the first electrical connector 10. The second electrical connector 20 can also include a forwardly extending magnetic element 50 adapted to receive the magnetic force created by the electromagnet 30, to provide a predetermined attractive magnetic force to assist mating the first electrical connector 10 and second electrical connector 20, and also to maintain the first electrical connector 10 and second electrical connector 20 in a coupled state. The magnetic element 50 may comprise or contain a material that the electromagnet 30 can act on, such as iron, cobalt, or nickel, or may comprise a permanent magnet. The magnetic element 50 can also be an electromagnet. The first electrical connector 10 and second electrical connector 20 each have a rear portion 16 and 26, respectively, adapted to make electrical connections with multiple wires of cables or cords.

In some other example embodiments, the first electrical connector 10 further comprises a proximity detector 80 adapted to detect a proximity of the second electrical connector 20 and to provide an input to the control circuit 60 that causes the control circuit 60 to disable the electrical current to the electromagnet 30 until the first electrical connector 10 is in a position relative to the second electrical connector 20 such that the electromagnet 30 applies the magnetic force to the magnetic element 50 in the second electrical connector 20.

B. Connectors

Referring to FIGS. 1-11, the electrical connector system that can use an electromagnet 30 to couple or assist in coupling connectors comprises a first electrical connector 10 and a second electrical connector 20. The electromagnet 30 is on the first electrical connector 10, and is adapted to produce a magnetic force that acts on a magnetic element 50 of the second electrical connector 20. The first electrical connector 10 may have an input device 40 that controls, directly or indirectly, current to the electromagnet 30, so that the electromagnet 30 can be selectively activated or deactivated.

The connectors 10, 20 may either be male or female, and are thus adapted to be mated or coupled together both electrically and mechanically. As shown in FIGS. 1-8, the first electrical connector 10 is a "male" type connector that mates with the female type second electrical connector 20. However, this arrangement is not critical or necessary to the embodiments disclosed herein. The first electrical connector 10 and the second electrical connector 20 may include rear portions 16 and 26, respectively that receive electrical cables 29. The opposite ends (not shown) of the cables 29 may be connected to a source of electrical power and/or signals, a piece of equipment or a device that receives electrical power and/or signals, another connector adapted to be connected to yet another cable, source, or piece of equipment, or to an intermediate device, such as a switch or multiplexer.

Figure 5:
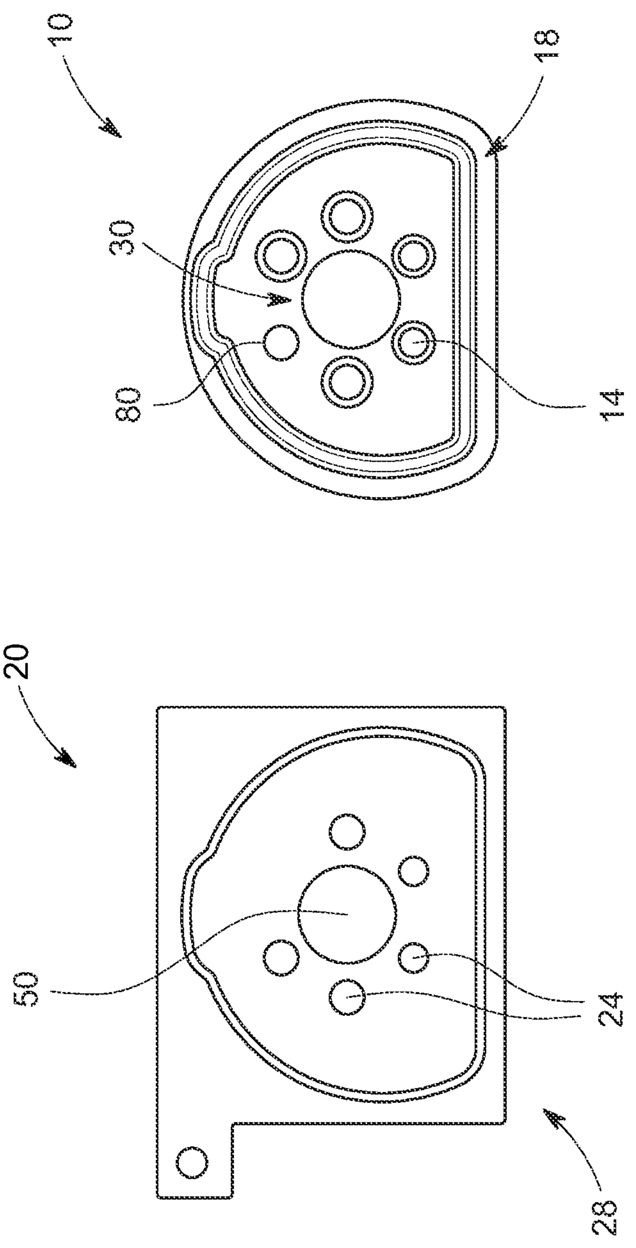
FIG. 5 is an end view of an electrical connector system in accordance with an example embodiment.

As best shown in FIG. 5, the connectors 10, 20 may have a size and shape designed to fit together only in a single orientation, so that they can only be connected together when properly aligned, such that the corresponding pins, sockets, or other electrical contacts are mated with the proper complementary contacts on the mating connector. Notably, as shown in FIGS. 1 and 5-7, the first electrical connector 10 may include a proximity detector 80 designed and configured to detect proximity and also proper alignment between the first electrical connector 10 and the second electrical connector 20. The proximity detector 80 may be embodied by any type of suitable device, such as a mechanical, contact-type device, or a non-contacting sensor, such as a hall-effect sensor. The latter may be used to detect the magnetic field of a magnetic element 50, in embodiments using a permanent magnet as the magnetic element 50. As discussed herein, the proximity detector 80 can be used to provide an input to the control circuit 60, which can accordingly enable or disable the electromagnet 30 in the first connector 10.

The proximity detector 80 may or may not involve components on the second electrical connector 20 to assist in providing a signal or indicator of alignment and distance between the first electrical connector 10 and the second electrical connector 20, such as magnets, contacts, physical structures such as protrusions or indents, etc.

Referring to FIGS. 1 and 5-8, the first electrical connector 10 may have a number of electrical contacts 14, which are shown in some of the figures as sockets, but which may also be pins, or combinations of pins and sockets, or may also be conductive components in shapes or configurations other than pins or sockets, such as conductive surfaces that contact corresponding elements or surfaces on the second electrical connector 20 when the connectors 10, 20 are coupled together. The electrical contacts 14, 24 are conductively coupled to wires or cables used in the connection, such as wires 19. For example, the first electrical connector 10 is adapted to receive a plurality of wires 19, wherein at least one wire of the plurality of wires 19 provides electrical power to the control circuit 60, and at least two wires of the plurality of wires 19 are conductively coupled to at least two contacts of the plurality of contacts 14.

Figure 7:
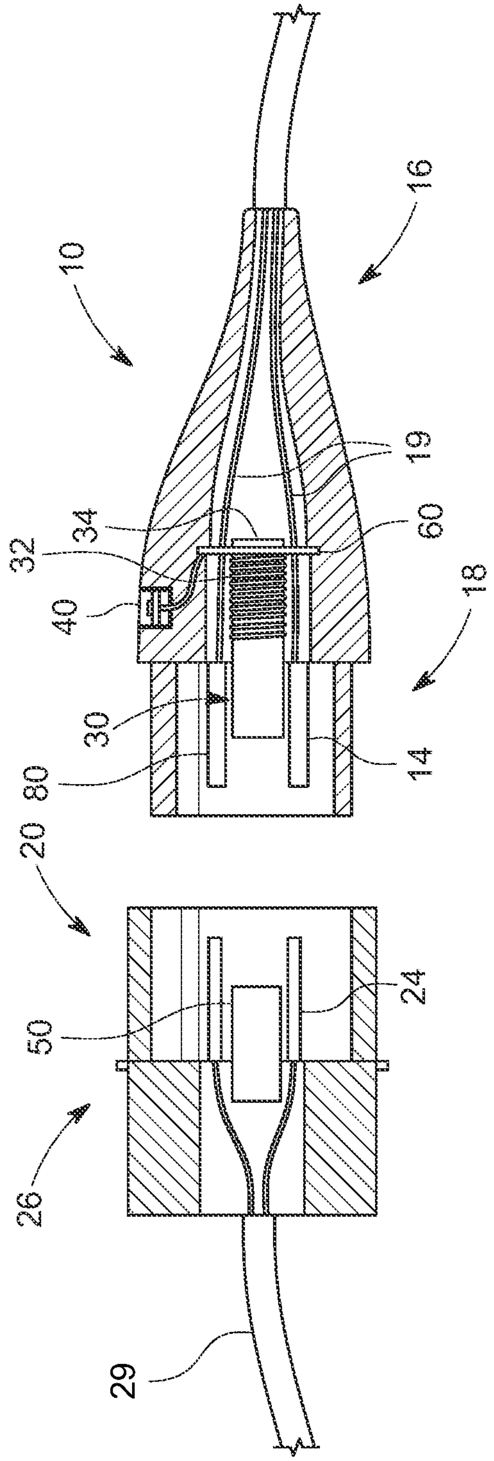
FIG. 7 is a sectional side view of an electrical connector system in accordance with an example embodiment.
Figure 8:
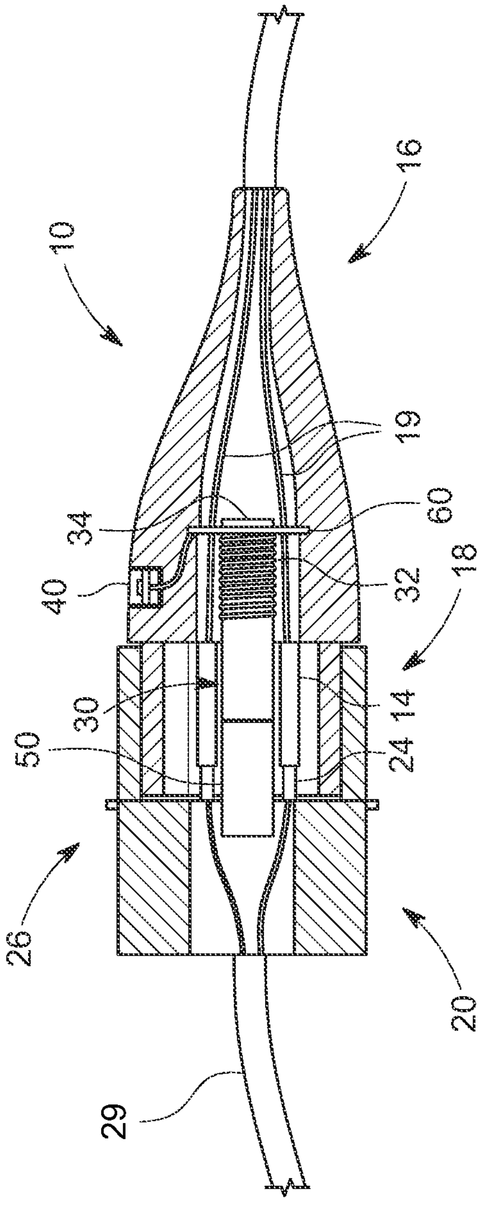
FIG. 8 is another sectional side view of an electrical connector system in accordance with an example embodiment.
Figure 9:
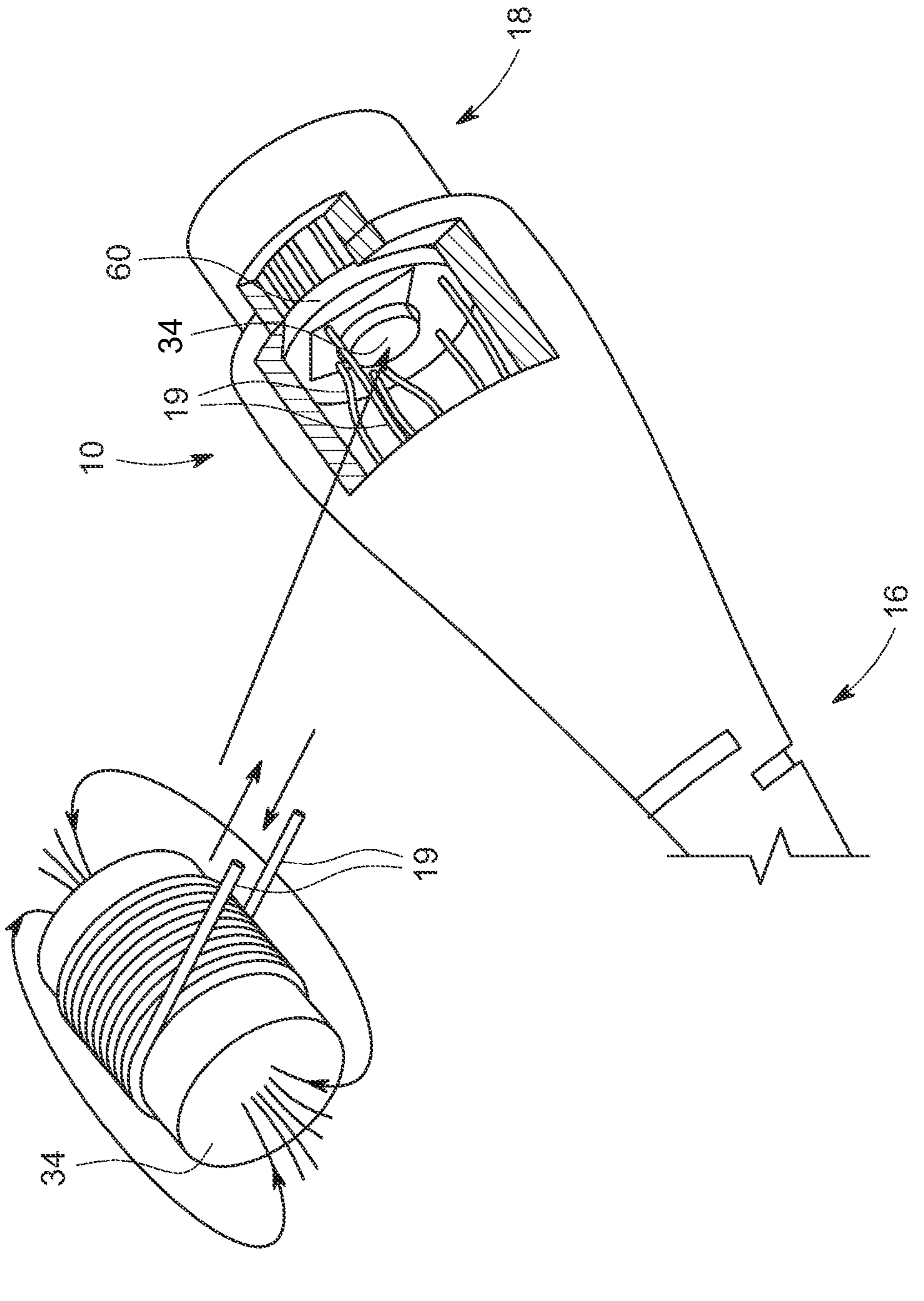
FIG. 9 is a perspective, cutaway view of an electrical connector and components in accordance with an example embodiment.

As shown in FIGS. 6-9, the wires 19 within the first electrical connector 10 may be connected to control circuit 60 as well as to electrical contacts 14. Some of the wires 19 may also be connected to and used to provide electrical power to the control circuit 60, without necessarily being connected to electrical contacts 14, as shown in FIG. 9.

As best shown in FIG. 8, the connectors 10, 20 and magnetic components are designed and configured so that the electromagnet 30 is very close to or touching the magnetic element 50 when the connectors 10, 20 are coupled. This helps ensure adequate attractive force between the two components to maintain the coupled condition. As also shown in FIGS. 7-8 and 10-11, the input device 40 is connected to the control circuit 60 so that it can provide an input to it. The input can be used to control and supply current to the electromagnet 30.

The second electrical connector 20 can be a chassis-mount type connector, mountable to a chassis 70. Again, this is not critical to the embodiments disclosed herein, and the second electrical connector 20 may be unmounted, similar to first electrical connector 10 in FIGS. 1-3, as an example.

Figure 6:
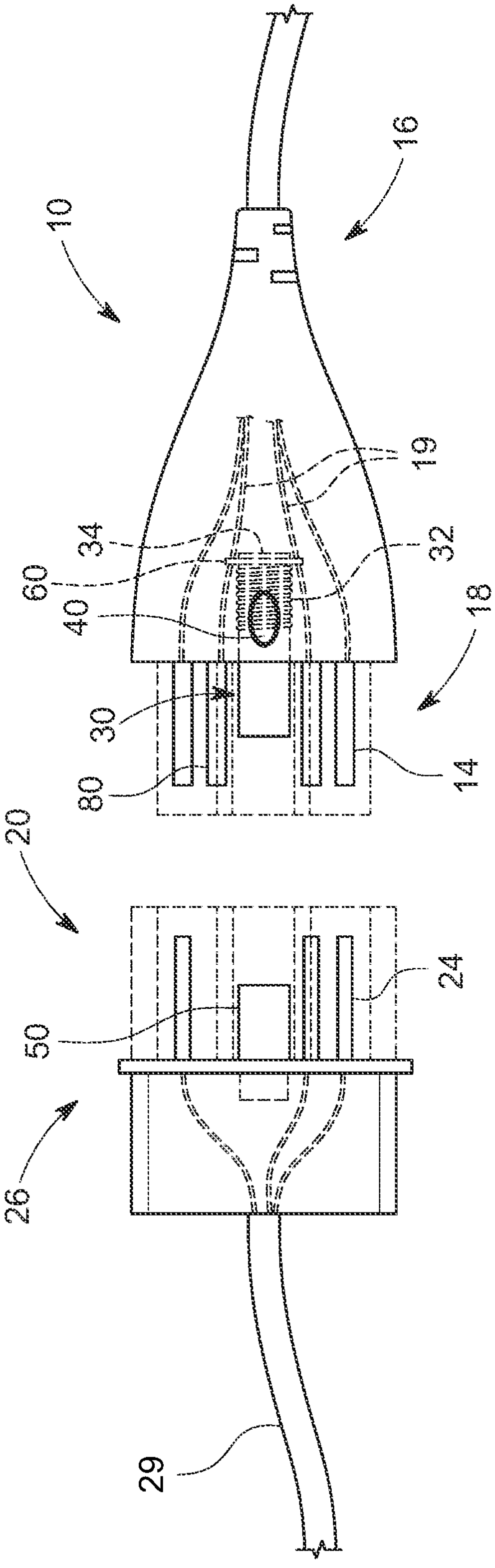
FIG. 6 is a side view of an electrical connector system in accordance with an example embodiment.

The second electrical connector 20 may have a number of electrical contacts 24, which are shown in some of the figures as pins, but which may also be sockets, or combinations of pins and sockets. The electrical contacts 24 may also be conductive components in shapes or configurations other than pins or sockets, such as conductive surfaces that contact corresponding elements or surfaces on the first electrical connector 10 when the connectors 10, 20 are coupled together. The electrical contacts 14, 24 are electrically (conductively) coupled to wires or cables used in the connection, such as cable 29, which contains wires that are coupled to the electrical contacts 24, as shown in FIGS. 6-8.

As shown in FIGS. 1-8, the second electrical connector 20 is a "female" type connector that mates with the male type first electrical connector 10. However, this arrangement is not critical or necessary to the embodiments disclosed herein. As shown in FIG. 5, the female portion of second electrical connector 20 may be shaped so that the first electrical connector 10 can only be coupled to it when properly oriented. The orientation of the two connectors 10, 20 relative to each other, as well as their proximity, can be determined by a proximity detector 80, which can be located on either connector, and may provide an output signal to a control circuit, such as control circuit 60.

C. Magnetic Components

As mentioned above briefly, the connectors 10, 20 and magnetic components are designed and configured so that the electromagnet 30 is very close to or touching the magnetic element 50 when the connectors 10, 20 are coupled, as best shown in FIG. 8. This helps ensure adequate attractive force between the two components to initiate and maintain the coupled condition. As also shown in FIGS. 7-8 and 10-11, the input device 40 is connected to the control circuit 60 so that the input device 40 can provide an input to it.

The input can be used to control and supply current to the electromagnet 30. The mating magnetic elements 30, 50 of the example embodiment illustrated in FIGS. 1-6 may be cylindrical in shape with substantially flat end faces that contact each other, or are in close proximity, when the first electrical connector 10 and the second electrical connector 20 are coupled together. The magnetic elements 30, 50 are preferably disposed and oriented within the male and female coupling components 18, 28 so that when the connectors 10, 20 are properly aligned for coupling the flat end faces of electromagnet 30 and magnetic element 50 are oppositely facing.

The preferred shape and disposition of the magnetic elements 30, 50 thus enable the faces of the magnetic elements 30, 50 to make good contact with each other when the first electrical connector 10 and second electrical connector 20 are coupled. They also provide a suitable amount of contact area so that a desired and adequate amount of magnetic force is present between the connectors 10, 20 when coupled. The magnetic elements 30, 50 may be securely affixed within the first electrical connector 10 and second electrical connector 20 using a suitable adhesive or by other methods known to those skilled in the art.

Figure 10:
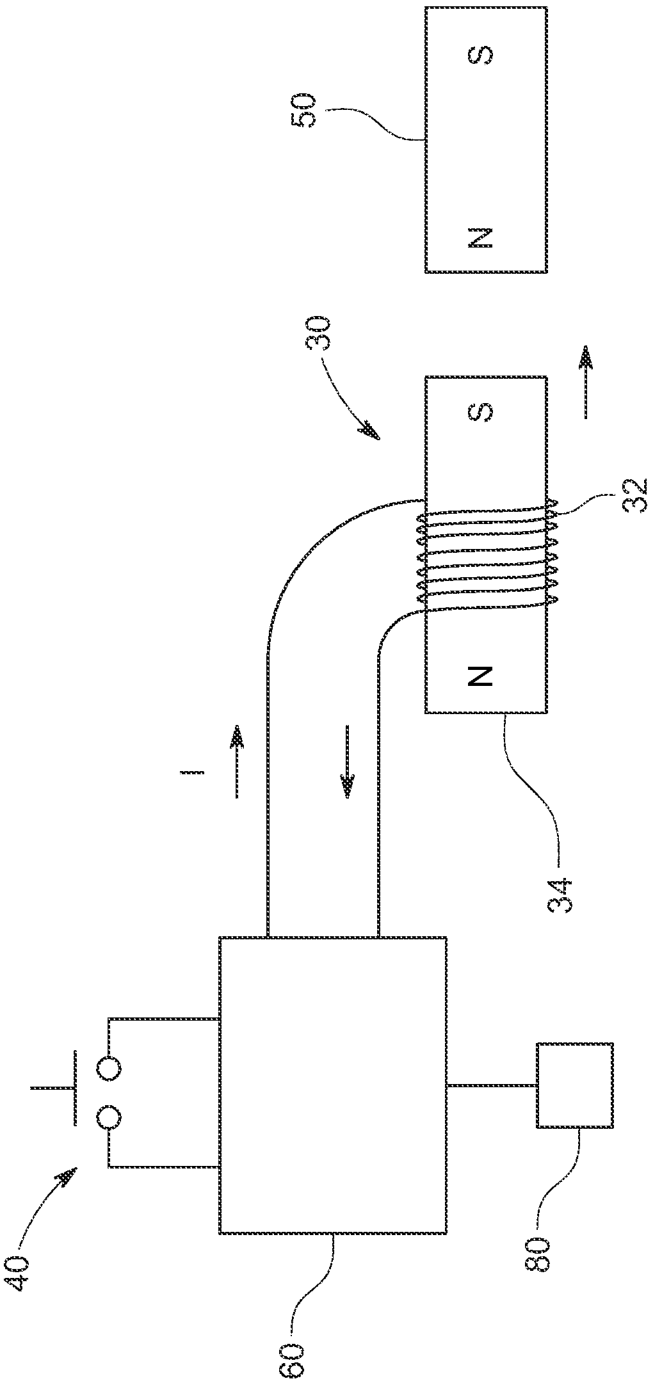
FIG. 10 is a functional diagram of an electrical connector system in accordance with an example embodiment.
Figure 11:
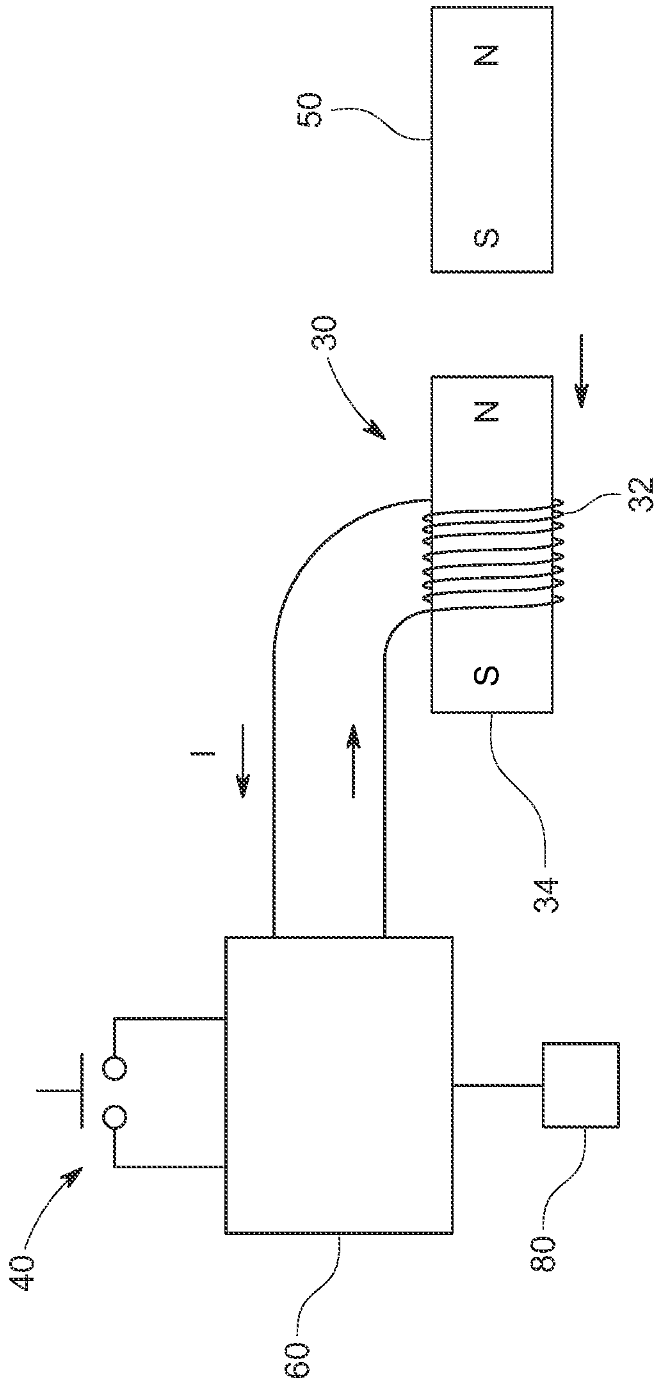
FIG. 11 is another functional diagram of an electrical connector system in accordance with an example embodiment.

As shown in FIGS. 6-8 and 10-11, the electromagnet 30 may comprise a core 34 and a coil 32, such that a current passing through the coil 32 creates a magnetic force that acts on magnetic element 50. The force may be attractive or repulsive, depending on the direction of the current I, as shown in FIGS. 10-11. The force is indicated by the arrows, wherein the force shown in FIG. 10 is attractive, and the force shown in FIG. 11 is repulsive. The attractive force is used when the first electrical connector 10 and the second electrical connector 20 are to be coupled together, and the repulsive force is used when the first electrical connector 10 and the second electrical connector 20 are to be unmated.

The strength of the electromagnet 30 can advantageously be adjusted as needed for the connectors 10,20 to couple or mate, by controlling the level of current I (indicated, for example, in FIGS. 10-11) supplied to the coil 32 by control circuit 60. In addition, the amount of current I supplied in different directions (which may be referred to as a first current and a second current) can be different, such that a different amount of magnetic force can be used for coupling and unmating the connectors 10, 20.

The connectors 10, 20 can be unmated automatically by operation of the control circuit 60 receiving an input from input device 40 after the first electrical connector 10 and second electrical connector 20 have already been coupled. The current supplied by either the input device 40 or the control circuit 60 for uncoupling the connectors 10, 20 can be of relatively short duration, since it does not need to be maintained as with the current used for coupling and maintaining the connectors 10, 20 in a coupled state. In contrast, the current used for coupling or mating the connectors 10, 20 will typically be maintained while the connectors 10, 20 are coupled together, although the mechanical fit between the connectors 10, 20 can also be used or assist in maintaining the coupling.

In some embodiments, the magnetic element 50 can be metal or contain metal that the electromagnet 30 acts on. Such materials may be or include iron, cobalt, and nickel, for example. If the element 50 is not a magnet, such materials are suitable when the electromagnet 30 is used to apply an attractive force to couple or mate the two connectors 10, 20.

However, the magnetic element 50 can also be a permanent magnet, as shown and indicated in FIGS. 10-11, in which case the electromagnet 30 can also be used to automatically unmate the connectors 10, 20, as best indicated by the force arrow and magnetic polarity illustrated by FIG. 11, in which the poles of the electromagnet 30 have been reversed from those shown in FIG. 10. Again, this effect is controlled by the direction of current through the coil 32 surrounding the core 34 of the electromagnet 30, which is controlled by the input device 40 or control circuit 60.

Generally, it is preferred to control the electromagnet 30 and select the magnetic element 50 to provide the minimum magnetic force suitable for the particular intended application of the connector system, since strong magnetic fields in proximity to electrical conductors can result in interference with the electrical signals in the conductors in some situations, as persons skilled in the art are aware. To this end, during coupling, a higher current can be used, and once the connectors 10, 20 are coupled, the current can be reduced by the control circuit 60, since it generally takes less force to maintain attraction at close proximity than it does to initiate the coupling.

D. Input Device and Control Circuit

As discussed above, the coupling and uncoupling or unmating of the first electrical connector 10 and the second electrical connector 20 can be initiated by an input device 40. In some example embodiments, the input device 40 can be a push button switch, and can provide current directly to the electromagnet coil 32. The input device 40, however, does not necessarily have to be a mechanical switch, and could be or comprise a sensor, such as a touch sensor, or other type of input device 40. The input device 40 can also provide an input to control circuit 60, as shown in FIGS. 10-11, with one possible input type being shown by a user pushing a button, in FIGS. 3-4, where FIG. 3 indicates an input to initiate coupling, and FIG. 4 indicates a second input to initiate unmating.

The input device 40 may also be, or include, a receiver or circuitry, which may be incorporated in control circuit 60 or which can be an independent part of the first electrical connector 10 or other part of the system. The receiver may receive a wired or wireless signal from the proximity of, or through, the second electrical connector 20. For example, if the connector system is used to charge an electric vehicle, with the charge being provided by the first electrical connector 10 to a second electrical connector 20 mounted on the vehicle, the input device 40 may receive a signal from the electric vehicle, directly or via the second electrical connector 20 to activate or deactivate the electromagnet 30.

The signal from the electric vehicle can be initiated based on any criteria, such as the charge state of the vehicle. Specifically, if the vehicle is in a discharged state, it may send a signal to the input device 40 which causes the control circuit to provide current to the electromagnet 30. In this case, the input device would recognize the signal from the vehicle as a first input, resulting in activating the input device 40 a first time such that the control circuit 60 provides current to the electromagnet 30 in a first direction. As discussed in more detail below, current in the first direction causes the electromagnet 30 to generate an attractive force that acts on magnetic element 50. Thus, the first electrical connector can automatically generate an attractive force to couple the connectors when an electric vehicle is in a discharged state. This type of input to input device 40 may be used alone or in conjunction with proximity detector 80, so that the connectors can be attracted together only when the first electrical connector 10 is brought into close proximity to the second electrical connector 20.

Similarly, the electric vehicle can send or provide a signal to the input device 40 when the electric vehicle is charged, such that a second input is provided to the input device 40 that causes the control circuit 60 to provide current to the electromagnet 30 in a second direction (i.e., the reverse of the first direction), which creates a repulsive force between the electromagnet 30 and magnetic element 50, which in turn causes the two connectors 10, 20 to automatically unmate or uncouple.

Any input from the input device 40 can be processed by the control circuit 60 to act differently depending on the connection status. Specifically, when the control circuit 60 receives an input while no current is being provided to the electromagnet 30, the control circuit 60 can provide a first current in the direction shown in FIG. 10, such that an attractive force is created between the electromagnet 30 and the magnetic element 50. Upon receiving a second input from input device 40, that may occur while there is current being provided, the control circuit 60 can reverse the current, such that a second current is provided, resulting in a repulsive force as indicated in FIG. 11, which can automatically unmate the first electrical connector 10 from the second electrical connector 20.

In addition to input device 40, the control circuit 60 can receive an input from a proximity detector 80. For example, the proximity detector 80 can provide an input to the control circuit 60, and the input can be used to disable the output current provided by the control circuit 60 until the first electrical connector 10 is close to the second electrical connector 20, such that the electromagnet 30 is not attracted to any metal or magnet other than the magnetic element 50 in the second electrical connector 20. The proximity detector 80 can detect both proximity between the two connectors 10, 20 and proper alignment, so that no magnetic force is generated tending to couple the first electrical connector 10 to the second electrical connector 20 until the connectors 10, 20 are properly aligned, as shown for example in FIGS. 1-5. In other words, the proximity detector 80 can disable the electrical current in the first direction until the first electrical connector 10 is in an aligned and proximate position relative to the second electrical connector 20.

The proximity detector 80 may be embodied by any type of suitable device, such as a mechanical, contact-type device, or a non-contacting sensor, such as a hall-effect sensor. The latter may be used to detect the magnetic field of a magnetic element 50, in embodiments using a permanent magnet as the magnetic element 50. As discussed herein, the proximity detector 80 can be used to provide an input to the control circuit 60, which can accordingly enable or disable the electromagnet 30 in the first connector 10.

The control circuit 60 may be powered by one or more wires 19 that bring power to first electrical connector 10, and may comprise circuitry enabled to perform the functions described herein, as will be appreciated by those of ordinary skill in the art. The control circuit 60 can be implemented using components on a printed circuit board within the first electrical connector 10, as shown in FIGS. 1-9. As shown in FIG. 9, the circuit board may include a hole through which one end of the core 34 of electromagnet 30 passes and is secured. The control circuit 60 can thus be adapted to provide the current needed to operate the electromagnet 30, by supplying current to the ends of coil 32, which may be terminated on the circuit board, as shown schematically in FIGS. 10 and 11.

Electrically, the control circuit 60 may include or comprise a latch that receives inputs from input device 40. For example, logic latches are known that can receive a momentary input and provide a continuous, "latched" output. The latch may also have processing circuit to receive an input from proximity detector 80, which may in turn be used to enable the output of current. As discussed previously, the proximity detector input can cause the control circuit 60 to disable current output until the first electrical connector 10 and the second electrical connector 20 are aligned and in close proximity. The proximity detector 80 can also be used to provide an indication to the control circuit 60, such that the circuit will provide an output, in the form of a second current, to unmate the connectors 10, 20 upon receiving a second input from input device 40. The proper action can be logically determined since the proximity detector 80 can indicate that the first electrical connector 10 and the second electrical connector 20 are already mated when the input device 40 is used a second time. The control circuit 60 can also provide the proper current by simply toggling its output each time the input device 40 is used.

E. Operation of Preferred Embodiment

In certain medical and other environments, it may be desirable for mating connectors to maintain a secure and reliable electrical connection but to readily separate if a certain amount of force is applied. Thus, for example, if a patient or visitor were to trip over or pull a cable or wire connected to medical monitoring or treatment equipment, it would be more desirable for the male and female components to separate than for a cable or cord to be forcefully ripped from the equipment, which could potentially cause substantial and costly damage to the equipment, or even cause the equipment to fall or be upended and possibly injure a patient or visitor. In such uses, a magnetic coupling can be useful, and can provide advantages not found in other types of connectors.

Another possible application where a magnetic coupling and uncoupling may be advantageous is in automotive charging connections. In this and similar applications, an electromagnet can provide a relatively high mating force, reducing or eliminating the need for a user to force connectors together.

A typical use of the example embodiments described herein is best shown in FIGS. 3-4 and 10-11. In use of the connector system, a user can activate the input device 40 a first time, as shown specifically in FIG. 3. This is typically done with the first electrical connector 10 and the second electrical connector 20 in an aligned and proximate position. In the aligned and proximate position, the proximity detector 80 will not disable the current supplied from the control circuit 60 to the coil 32 of electromagnet 30. Thus, aligning the first electrical connector 10 and the second electrical connector 20 initiates the process of coupling the connectors. Once aligned, a user will move the first electrical connector 10 into proximity with the second electrical connector 20, such that the electromagnet 30 of the first electrical connector 10 applies an attractive magnetic force to the magnetic element 50 in the second electrical connector 20.

Figure 3:
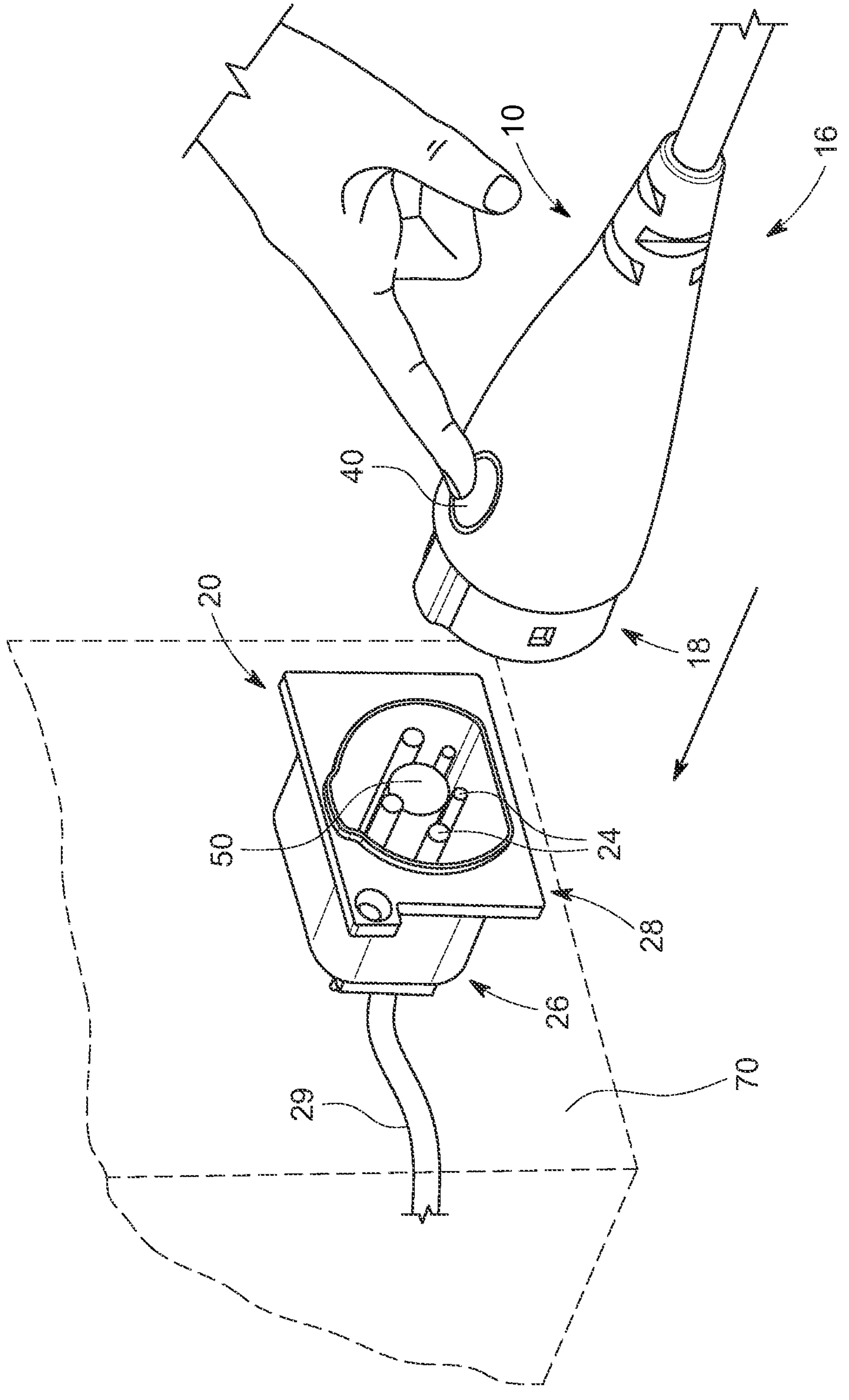
FIG. 3 is a perspective view of an electrical connector system in use in accordance with an example embodiment.
Figure 4:
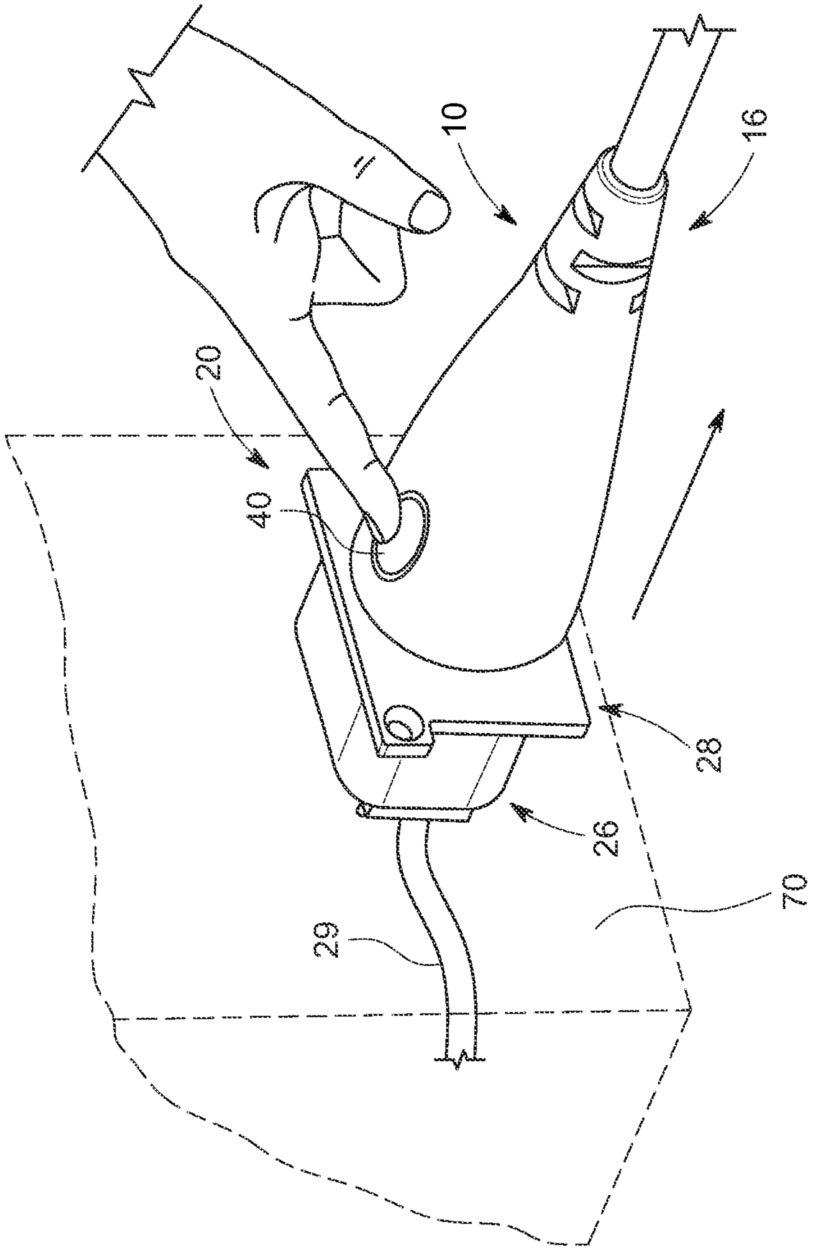
FIG. 4 is another perspective view of an electrical connector system in use in accordance with an example embodiment.

Note that the user can activate the input device 40 (such as by pressing a push button switch, for example) at any time. Alternatively, as discussed above, the input device 40 can be a circuit or device that receives a signal from an outside source, such as from an electric vehicle, which can be based on the charge state of the vehicle, among other conditions. Due to the latching action of control circuit 60 as described, the input device 40 can be used before or after the first electrical connector 10 is aligned and brought into proximity with the second electrical connector 20. Once the process is initiated and the connectors 10, 20 are in an aligned and proximate position relative to each other, the control circuit 60 can provide a first electrical current to the electromagnet 30, in a first direction, such that, if magnetic element 50 is a permanent magnet, an attractive force will result. Thus, a magnetic attraction between the electromagnet 30 and magnetic element 50 will draw the two connectors 10, 20 together and couple them, which also results in an electrical connection or coupling between electrical contacts 14, 24. The coupling operation and resulting current and magnetic force are generally illustrated in FIGS. 3 and 10, while the physical relationship of the coupled first electrical connector 10 and second electrical connector 20 is shown in FIG. 8.

When a user or the system (e.g., a signal from a device or an electric vehicle) activates the input device 40 a second time, or based on another input to the control circuit 60, the control circuit 60 will receive the input and provide an electrical current to the electromagnet 30 in a second direction (e.g., the reverse of the first direction), which creates a repulsive force between the electromagnet 30 and magnetic element 50, which in turn causes the two connectors 10, 20 to automatically unmate or uncouple. The unmating also results in the electrical connection between the multiple contacts 14, 24 to be severed.

Unless otherwise defined, all technical and scientific terms used herein have the same meaning as commonly understood by one of ordinary skill in the art to which this invention belongs. Although methods and materials similar to or equivalent to those described herein can be used in the practice or testing of the various embodiments of the present disclosure, suitable methods and materials are described above. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. The various embodiments of the present disclosure may be embodied in other specific forms without departing from the spirit or essential attributes thereof, and it is therefore desired that the various embodiments in the present disclosure be considered in all respects as illustrative and not restrictive. Any headings utilized within the description are for convenience only and have no legal or limiting effect.

What is claimed is:

1. An electrical connector system comprising:

a first connector having an electromagnet and a first plurality of electrical contacts that substantially surround the electromagnet, wherein the electromagnet produces a magnetic force responsive to an electrical current supplied to the electromagnet;

a control circuit that functions to control the electrical current supplied to the electromagnet by selectively applying the electrical current to the electromagnet; and a second connector having a magnetic element and a second plurality of electrical contacts that substantially surround the magnetic element; and wherein the magnetic force acts on the magnetic element to cause the first connector to be attracted to and coupled with the second connector serving to electrically couple the first plurality of electrical contacts with the second plurality of electrical contacts.

2. The electrical connector system of claim 1, further comprising a control circuit that operates to control a magnitude of the electrical current supplied to the electromagnet.

3. The electrical connector system of claim 1, further comprising an input device that receives an input and provides an output that causes the electrical current to be supplied to the electromagnet.

4. The electrical connector system of claim 1, wherein the input device comprises a switch.

5. The electrical connector system of claim 4, wherein the switch is located on a housing of the first connector.

6. The electrical connector system of claim 1, wherein the magnetic force changes responsive to a change in the electrical current supplied to the electromagnet.

7. The electrical connector system of claim 1, wherein the magnetic element comprises a permanent magnet.

8. The electrical connector system of claim 1, wherein the first plurality of electrical contacts comprise a plurality of pins and wherein the second plurality of electrical contacts comprise a plurality of sockets.

9. The electrical connector system of claim 1, the first plurality of electrical contacts comprises a plurality of sockets and where in the second plurality of electrical contacts comprise pins.

10. The electrical connector system of claim 1, wherein the first electrical connector interfaces with a cable having a plurality of electrical conductors, wherein at least one of the plurality of conductors supplies the electrical current to the electromagnet and wherein at least one of the plurality of conductors is electrically coupled to at least one of the first plurality of electrical contacts.

11. The electrical connector system of claim 10, wherein the second connector is chassis-mounted.

12. An electrical connector system comprising:

a first connector having an electromagnet and a first plurality of electrical contacts that substantially surround the electromagnet, wherein the electromagnet produces a magnetic force responsive to an electrical current supplied to the electromagnet, wherein the magnetic force is an attractive magnetic force responsive to the electrical current flowing in a first direction and wherein the magnetic force is a repulsive magnetic force responsive to the electrical current flowing in an opposite second direction;

a control circuit that functions to control the electrical current supplied to the electromagnet by selectively applying the electrical current to the electromagnet; and a second connector having a magnetic element and a second plurality of electrical contacts that substantially surround the magnetic element; and wherein the attractive magnetic force acts on the magnetic element to cause the first connector to be attracted to and coupled with the second connector serving to electrically couple the first plurality of electrical contacts with the second plurality of electrical contacts.

13. The electrical connector system of claim 12, wherein the repulsive magnetic force acts on the magnetic to cause the first connector to be repulsed from the second connector to prevent electrical coupling of the first plurality of contacts with the second plurality of contacts.

14. The electrical connector system of claim 12, further comprising a control circuit that operates to control a magnitude of the electrical current supplied to the electromagnet.

15. The electrical connector system of claim 12, further comprising an input device that receives an input and provides an output that causes the electrical current to be supplied to the electromagnet.

16. The electrical connector system of claim 12, wherein the input device comprises a switch.

17. The electrical connector system of claim 16, wherein the switch is located on a housing of the first connector.

18. An electrical connector system comprising:

a first connector having an electromagnet, a proximity detector, and a first plurality of electrical contacts that substantially surround the electromagnet, wherein the electromagnet produces a magnetic force responsive to an electrical current supplied to the electromagnet and wherein the proximity detector indicates when the second connector is within a predetermined range of the first connector;

a control circuit that functions to control the electrical current supplied to the electromagnet by selectively applying the electrical current to the electromagnet; and a second connector having a magnetic element and a second plurality of electrical contacts that substantially surround the magnetic element; and wherein the magnetic force acts on the magnetic element to cause the first connector to be attracted to and coupled with the second connector serving to electrically couple the first plurality of electrical contacts with the second plurality of electrical contacts.

19. The electrical connector system of claim 18, wherein the electrical current supplied to the electromagnetic is supplied responsive to the proximity detector indicating that the second connector is within the predetermined range of the first connector.

* * * * *